US008238850B2

United States Patent
Amano et al.

(10) Patent No.: US 8,238,850 B2
(45) Date of Patent: Aug. 7, 2012

(54) RADIO COMMUNICATION METHOD AND EQUIPMENT

(75) Inventors: Shigeru Amano, Tokyo (JP); Takeshi Ichikawa, Kangawa (JP)

(73) Assignee: Lapis Semiconductor Co., Ltd. (JP)

( * ) Notice: Subject to any disclaimer, the term of this patent is extended or adjusted under 35 U.S.C. 154(b) by 1626 days.

(21) Appl. No.: 11/359,503

(22) Filed: Feb. 23, 2006

(65) Prior Publication Data

US 2006/0270436 A1    Nov. 30, 2006

(30) Foreign Application Priority Data

May 16, 2005   (JP) .................................. 2005-142983

(51) Int. Cl.
*H04B 17/00* (2006.01)
(52) U.S. Cl. ..................... 455/115.3; 455/63.4; 455/522; 455/334; 455/115.1
(58) Field of Classification Search ................. 455/63.4, 455/562.1, 522, 13.4, 127.1, 127.5, 334, 455/343.1, 343.5
See application file for complete search history.

(56) References Cited

U.S. PATENT DOCUMENTS

| 5,987,033 | A  | * | 11/1999 | Boer et al. ..................... 370/445 |
| 6,005,853 | A  | * | 12/1999 | Wang et al. .................... 370/332 |
| 6,469,997 | B1 | * | 10/2002 | Dorenbosch et al. ......... 370/337 |
| 6,978,149 | B1 | * | 12/2005 | Morelli et al. ................ 455/522 |
| 2004/0063412 | A1 | * | 4/2004 | Kim et al. .................. 455/226.2 |
| 2004/0071246 | A1 | * | 4/2004 | Diepstraten et al. .......... 375/354 |
| 2005/0105650 | A1 | * | 5/2005 | Paille et al. .................... 375/324 |
| 2005/0250452 | A1 | * | 11/2005 | Walton et al. ................ 455/63.4 |
| 2006/0045220 | A1 | * | 3/2006 | Biswas et al. ................. 375/347 |

\* cited by examiner

*Primary Examiner* — Lester Kincaid
*Assistant Examiner* — Mehmood B Khan
(74) *Attorney, Agent, or Firm* — Studebaker & Brackett PC; Donald R. Studebaker

(57) ABSTRACT

A radio communication method includes deciding either a sending timing or a receiving timing; measuring a receiving electric intensity; comparing a stored value and the measured receiving electric intensity; and starting a sending operation when the measure receiving electric intensity is smaller than the stored value in the sending timing and starting a receiving operation when the measurement receiving electric intensity is greater than the stored value in the receiving timing.

5 Claims, 3 Drawing Sheets

RADIO COMMUNICATION METHOD AND EQUIPMENT

BACK GROUND OF THE INVENTION

1. Field of the Invention

The present invention relates to power saving of radio communication equipment.

2. Description of the Related Art

Radio communication networks have a function of data communication between a plurality of radio terminals in radio stations and communication areas covered by the radio stations. The radio stations start receiving operation in a fixed intervals, and during the operation the stations receive the data sent from the radio terminals. Further, when the radio stations send the data to radio terminals, the data is sent after the stations ascertain if a radio terminal is not sending data at fixed intervals. Similarly, the radio terminals start receiving operation in a fixed intervals, and during the operation the terminals receive the data sent from the radio stations. Further, when the radio terminals send the data to radio stations, the data is sent after the terminals ascertain if a radio station is not sending data at fixed intervals.

For the above reasons, the radio stations and the radio terminals measure the radio status (electric intensity) in accessed communication channel and then the receiving operation is done when the electric intensity is more than the predetermined criterion, while the sending operation is done when the electric intensity is less than the criterion.

SUMMARY OF THE INVENTION

However, as the above mentioned stations and terminals in the radio communication networks select the sending operations or receiving operation based on the results of measuring the electric intensity at fixed interval, there is a following problem.

Radio equipment used in the stations and terminals generally consist of a sending-and-receiving unit operating sending and receiving at radio frequency; and a data processing unit processing sending and receiving data. The electric intensity is measured at fixed intervals, and the data processing unit is activated by the measuring results for sending or receiving operation.

However, there may be a case where the receiving operation is only necessary because the sending data does not exists always. In such a case where the data processing unit is activated at fixed intervals, the unnecessary operation of the data processing unit will cause limitation to the power saving.

The object of the present invention is to reduce power consumption of radio communication equipments by neglecting completely unnecessary operations.

A radio communication equipment according to the present invention, which includes the sending and receiving unit operating sending and receiving data between other stations and terminals; and the data processing unit processing sending and receiving data and controlling the operation of sending and receiving unit, consists of a sending and receiving unit, a timing control unit, a electric intensity measuring unit, a decision unit, a modulation unit, a demodulation unit, and receiving control unit. The sending and receiving unit outputs a sending timing signal and a receiving timing signal in a fixed intervals. The electric intensity measuring unit measures the receiving electric intensity in the radio communication channel when the sending timing signal and the receiving timing signal is given. The decision unit outputs a sending enabling signal when the above receiving timing signal is given and the receiving electric intensity is less than the criterion measure; and also outputs a receiving enabling signal when the above mentioned receiving electric intensity is more than the criterion measure. The modulation unit modulates and sends the sending data from the above mentioned data processing unit when the sending enabling signal is given. The demodulation unit demodulates the receiving signal and generates the receiving data when a modulation enabling signal is inputted. When the receiving enabling signal is inputted, the receiving control unit outputs the above mentioned demodulation enabling signal to the above mentioned demodulation unit and decides whether the receiving data generated by the demodulation unit is correct, or not, and then the receiving control unit outputs the above receiving data with a data receiving signal to the above data processing unit when the receiving data is decided to be correct, and stops outputting the above mentioned demodulation enabling signal when the receiving data is correct.

At the same time, the data processing unit is configured to be activated by the before mentioned sending enabling signal; to output the before mentioned sending data to the above sending; and to input the above mentioned receiving data from the receiving and sending unit, being activated by the before mentioned data receiving signal.

According to the present invention, the electric intensity is measured by the sending and receiving unit during the sending timing, and when the measured value is less than the criterion measure, the sending data is outputted by giving enabling signal to the data processing unit. Further, the electric intensity is measured at the receiving timing, and when the measured value is more than the criterion measure and the receiving data is decided to be correct, the receiving data is given to the data processing unit with the receiving signal. As the data processing unit is not activated except in the necessary occasion, there is an effect of power saving.

DETAILED DESCRIPTION OF THE PREFERRED EMBODIMENTS

Further power saving can be realized by installing a power saving control unit supplying the sending and receiving unit with the clock signal and the power, being directed by the operation mode control signal inputted by the data processing unit; besides the sending timing signal, the receiving timing signal, sending enabling signal, and the modulation enabling signal within the sending and receiving unit.

First Embodiment

Figure 1:
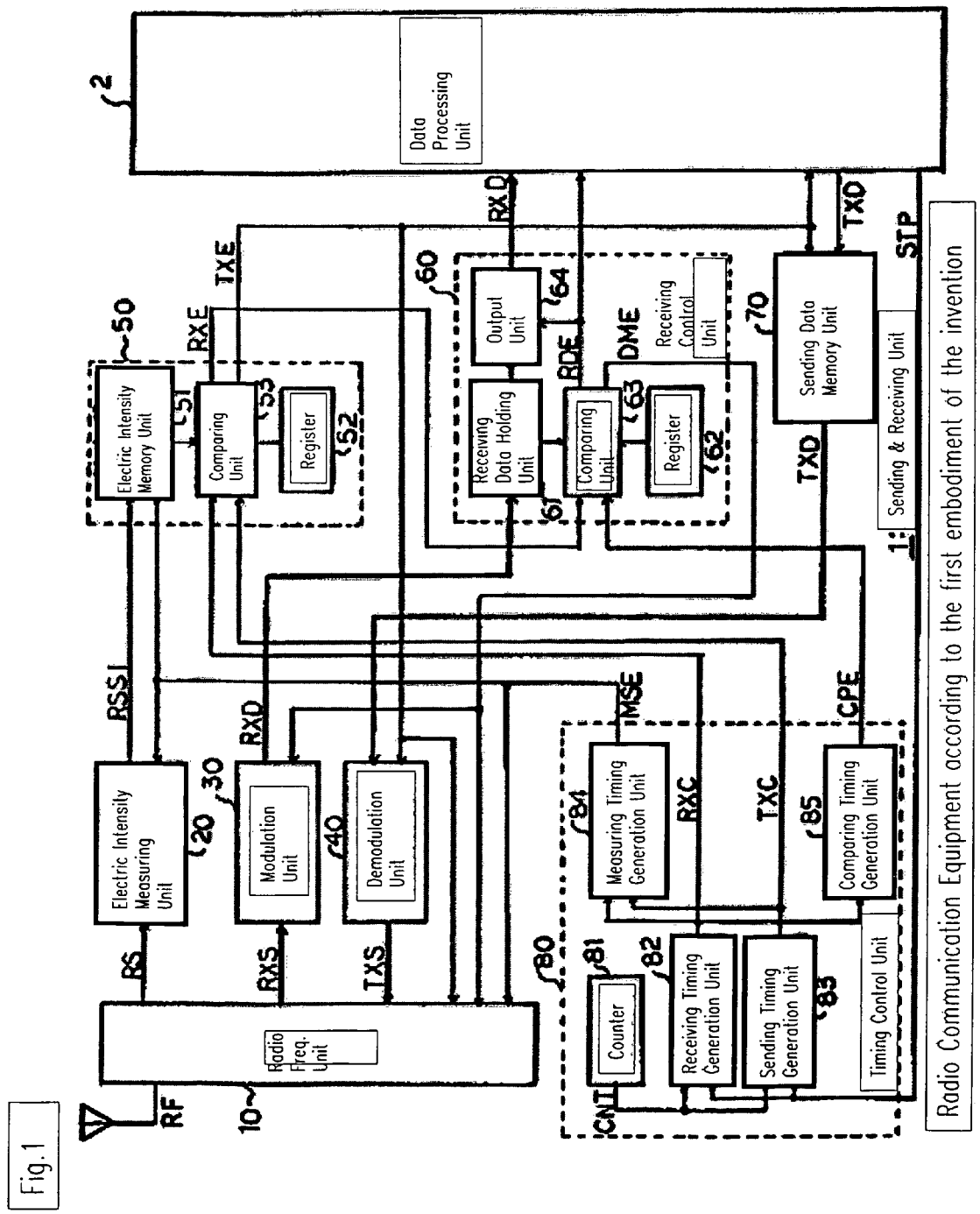
FIG. 1 is a general configuration diagram of a radio communication equipment according to the first embodiment of the invention.

FIG. 1 is a view of general configuration diagram according to the first embodiment of the present invention. The radio communication equipment largely consists of a sending and receiving unit 1 being configured to conduct sending and receiving operation at a radio frequency; and a data processing unit 2 being configured to process the sending and receiving data and control the sending and receiving unit 1.

The sending and receiving unit 1 includes a radio frequency unit with antenna 10, a electric intensity measuring unit 20, a demodulation unit 30, a modulation unit 40, a decision unit 40, a receiving control unit 60, a sending data memory unit 70, and a timing control unit 80.

The radio frequency unit 10 consists of a receiving unit and a sending unit not shown in drawings. The receiving unit amplifies selectively the specified frequency component of the receiving channel in a radio frequency signal RF inputted into an antenna; and converts the frequency component to a base-band receiving signal, then the receiving unit inputs the base-band signal into the demodulation unit 30, and inputs a receiving level signal RS responding to the receiving level into the electric intensity measuring unit 20. The sending unit converts a base-band sending signal TXS given from the modulation unit 40 to a specified radio frequency signal RF and amplifies the specified radio frequency signal into a fixed level, then sends the specified radio frequency signal from the antenna. At the same time, in the radio frequency unit 10, the receiving operation is done when a measuring control signal MSE or a demodulation enabling signal DME is inputted, and the sending operation is done when a sending enabling signal TXE is inputted, so that the sending operation and the receiving operation can not be done simultaneously.

The electric intensity measuring unit 20 conducts digital processing of the receiving level signal RS, being directed by the measuring control signal MSE given from the radio frequency unit 10 at the starting time of the sending operation or the receiving operation, and calculates a stable receiving electric intensity signal RSSI. The measured value of the receiving electric intensity signal RSSI is given to the decision unit 50.

When the demodulation enabling signal DME is given from the receiving control unit 60, the demodulation unit 30 demodulates the receiving signal RXS given from the radio frequency unit 10 to the receiving data RXD and outputs the receiving data RXD to the receiving control unit 60. Meanwhile, when the sending enabling signal RXE is given from the decision unit 50, the modulation unit 40 modulates the sending data TXD and outputs the modulated signal to the radio frequency unit 10.

The decision unit 50 compares the electric intensity signal RSSI with the criterion measure, based on the measuring control signal MSE, the receiving control signal RXC, and sending control signal TXC, being given from the timing control unit 80, and the decision unit 50 outputs the receiving enabling signal MSE, or the sending enabling signal TXE, or the sending enabling signal TXE, responding to the above comparing results. The decision unit 50 consists of an electric intensity memory unit 51 being configured to save the value of the receiving electric intensity signal RSSI being inputted from the electric intensity measuring unit 20, directed by the measuring control signal MSE; a register 52 being configured to hold the criterion measure set by the data processing unit 2; and a comparing unit 53 being configured to compare the receiving electric intensity signal RSSI with the criterion measure. When the receiving control signal RXC is inputted and the receiving electric intensity signal RSSI is more than the criterion measure, the comparing unit 53 decides that radio signal being received from other radio equipment and the comparing unit 53 outputs the receiving enabling signal RXE to the receiving control unit 60. When the sending control signal TXC is inputted and the receiving electric intensity signal RSSI is less than the criterion measure, the comparing unit 53 decides that any other radio equipment is not sending radio signal and the comparing unit 53 outputs the sending enabling signal TXE to the radio frequency unit 10, the modulation unit 40, the sending data memory unit 70, and data processing unit 2.

The receiving control unit 60 holds the receiving data RXD from the demodulation unit 30, and detects the specified pattern, for example preamble, etc, in the header of the receiving data RXD. When the specified pattern is detected, the sending control unit 60 continues the modulation, and also outputs the receiving data RXD being outputted from the demodulation unit 30 into the data processing unit 2. When the specified pattern is not detected, the sending control unit 60 halts the further operation of the demodulation unit 30. The sending control unit 60 consists of a receiving data holding unit 61 holding the receiving data RXD; a register 62 having the specified data set by the data processing 2; a comparing unit 63 comparing the header of the receiving data RXD with the specified data; and an output unit 64 outputting the receiving data RXD to the data processing unit 2.

At the same time, when the receiving enabling signal RXE from the decision 50 is given and the comparing control signal CPE from the timing control unit 80 is given, the comparing unit 63 outputs the receiving enabling signal DME to the radio frequency unit 10 and the demodulation unit 30. Then, the comparing unit 63 compares the header of the receiving data RXD with the specified pattern. In the case of matching, the comparing unit 63 continues to output demodulation enabling signal DME, deciding that the correct receiving data is received. In the case of mismatching, the comparing unit 63 halts the demodulation enabling signal DME at the time point when the comparing control signal CPE is stopped. Additionally, the comparing unit 63 starts outputting the data receiving signal RDE to the output unit 64 and the data processing 2, when the receiving data RXD is correct, and continues to output the above data receiving signal RDE while the receiving enabling signal is given. The output unit 64 read out the receiving data RXD being held in the receiving data holding unit 61, and outputs the read data to the data processing unit 2.

The sending data memory unit 70 saves the sending data TXD given from the data processing unit 2. When the sending enabling signal TXE is inputted from the decision unit 50, the sending data memory unit 70 read out the saved sending data TXD in serial to sends the read data to the modulation unit 40.

The timing control unit 80 generates the sending control signal RXC, the sending control signal TXC, the measuring control signal MSE, and the comparing control signal CPE, in a fixed intervals, based on the clock signal not shown in the drawings. The timing control unit 80 consists of a counter 81 counting repeatedly within a fixed range (ex. 0~100); a receiving timing generation unit 82 outputting the sending control signal RXC when the counter value CNT of the counter 81 is within a fixed range; and a sending timing generation unit 83 outputting the sending control signal TXC when the counter value CNT of the counter 81 is within another fixed range. At the same time, the receiving timing unit 82 or the sending timing unit 83 is reset forcibly by a stop signal STP given from the data processing unit 2, without relationship with the counter value CNT.

Furthermore, the timing control unit 80 consists of a measuring-timing generation unit 84; and a comparing timing generation unit 85. The measuring timing generation unit 84 outputs the measuring control signal MSE to stabilize the measuring of the electric intensity measuring 20 for a fixed period from when the sending control signal RXC or the sending control signal TXC is outputted. The comparing timing generation unit 85 outputs the comparing control signal CPE for a fixed period from when the sending control signal RXC is outputted. Further, in the timing control unit 80, the counter 81 or the timing controlling data for timing generation unit 82~85 can be set by the data processing 2.

Figure 2:
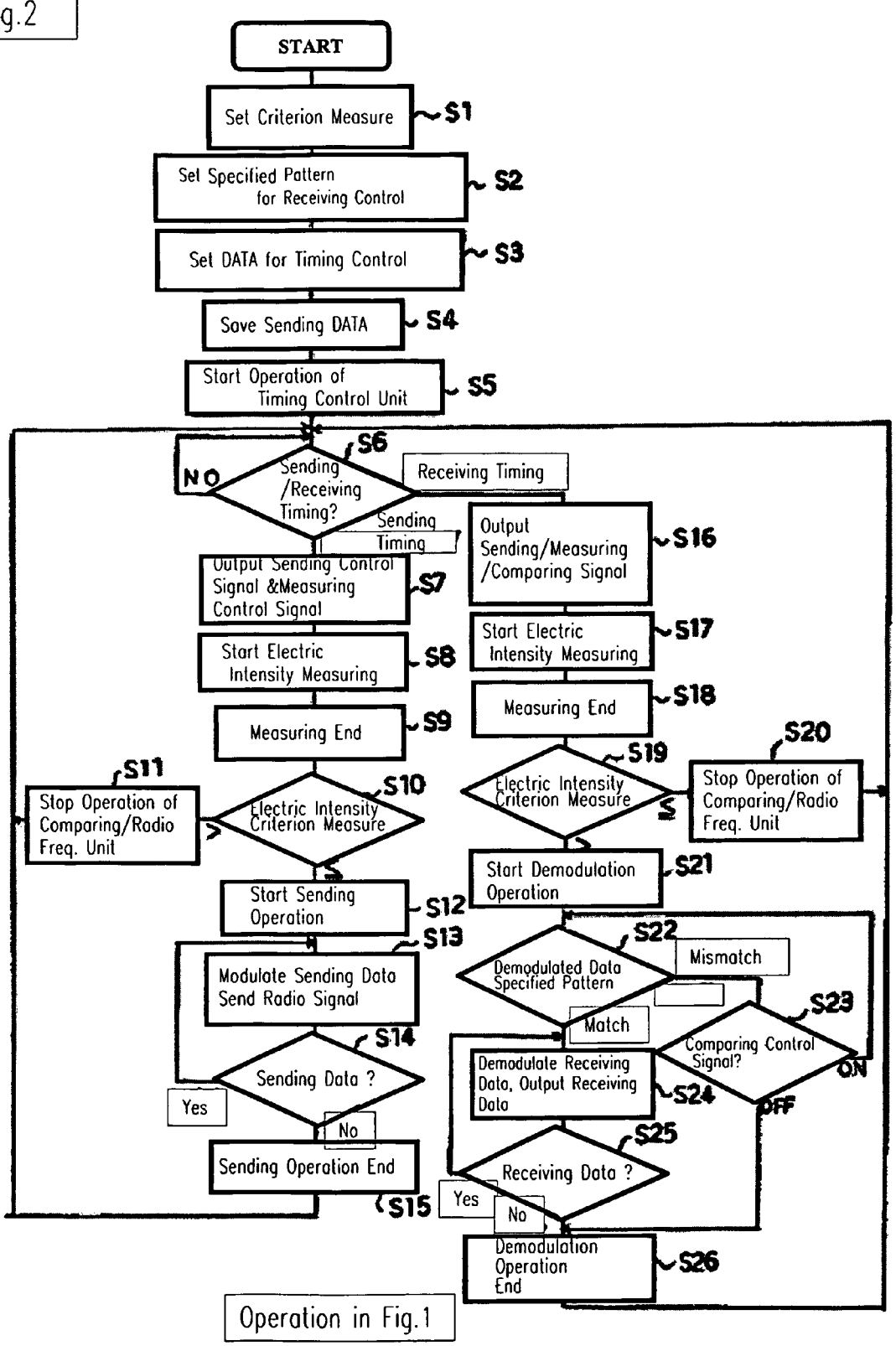
FIG. 2 is a flowchart describing the operation in FIG. 1.

FIG. 2 is a flowchart describing an operation of FIG. 1. The operation of FIG. 1 will be explained as below, referring to FIG. 2.

Firstly, the data processing unit 2 sets the criterion measure in the register 52 of the decision unit 50 in the sending and receiving unit 1; the specified pattern in the register 62 of the sending control unit 60; and the control data in the timing control unit 80, respectively, on demand (step S1~S3). The data processing 2 also saves the sending data TXD (step S4). Subsequently, the data processing unit 2 moves to the power saving mode.

In the sending and receiving unit 1, the counter 81 of the timing control unit 80 operates, (step S5,S6), and when the counter value becomes the value set by the sending timing generation unit 83, the sending control signal TXC outputs from the timing generation unit 83, further, the measuring control signal MSE outputs from the measuring timing generation unit 84 (step S7). Additionally, when the counter value CNT of the counter 81 becomes the value set by the receiving timing generation unit 82, the receiving control signal RXC outputs from the receiving timing generation unit 82, furthermore, the measuring control signal MSE outputs from the measuring timing generation unit 84, and the comparing control signal CPE outputs from the comparing timing generation unit 85 (step S16).

In the sending timing, when the sending control signal TXC and the measuring control signal MSE outputs, the radio frequency unit 10 is changed to the receiving operation status, then the measurement of the receiving electric intensity RSSI is started (step S8). After a fixed period, the measuring control signal MSE is halted, and the measuring operation of the electric intensity measuring unit 20 is finished, then the measuring results of the receiving electric intensity signal RSSI is saved in the electric intensity memory unit 51 of the decision unit 50 (step S9).

The receiving electric intensity signal RSSI saved in the electric intensity memory unit 51 is compared with the value set in the register 52 in the comparing unit 53 (step S10). When the receiving electric intensity signal RSSI is more than the above set value, the comparing unit 53 decides that other radio equipment is operating radio communication, then halts the operation without outputting the sending enabling signal TXE and halts the operation of the radio frequency unit 10 (step S11), too.

When the receiving electric intensity signal RSSI is less than the set value in the comparing operation in the step S10, the decision unit 53 decides that any other radio equipment is not sending data, then the decision unit 53 outputs the sending enabling signal TXE to the radio frequency unit 10, the modulation unit 40, the sending data memory unit 70, and the data processing unit 2. Consequently, the sending operation starts (step S12), and as the radio frequency unit 10 becomes the sending operation status, the sending data TXD saved in the sending data memory unit 70 is read out in serial and is modulated by the modulation unit 40, then the modulated signal is transformed to the radio frequency signal RF and sent (step S13).

Furthermore, the data processing unit 2 moves to the normal operation mode, directed by the sending enabling signal TXE, and saves the sending data TXD in serial in the sending data memory unit 70. At the time point when the data processing 2 sends all the sending data TXD being necessary to be sent (step S14), the data processing 2 outputs the stop signal STP to the sending and receiving unit 1, and returns to the power saving mode.

In the sending and receiving unit 1, the sending timing generation unit 83 is reset by the stop signal STP, and the sending control signal TXC is stopped. Consequently, the sending enabling signal TXC from the decision unit 50 is halted, and the radio frequency unit 10, the modulation unit 40, and the sending data memory unit 70 stop the operations (step S15).

Meanwhile, in the sending timing, when the sending control signal RXC, the measuring control signal MSE, and the comparing control signal CPE output (step S16), the radio frequency unit 10 becomes the receiving operation status, the receiving electric intensity RSSI is measured by the electric intensity measuring unit 20 (step S17). After a fixed period, the measuring control signal MSE is stopped and the measuring operation of the electric intensity measuring unit 20 is stopped, then the measuring result, the receiving electric intensity signal RSSI is saved in the electric intensity memory unit 51 of the decision unit 50 (step S18).

The receiving electric intensity signal RSSI saved in the electric intensity memory unit 51 is compared with the value set in the register 52 in the comparing unit 53 (step S19). When the receiving electric intensity signal RSSI is less than the set value, the comparing unit 53 decides that other radio equipment is not sending data, then the comparing unit 53 halts the operation without outputting the receiving enabling signal RXE, and also halts the operation of the radio frequency unit 10 (step S20).

When the sending electric intensity RSSI is more than the set value in the comparing of the step S19, the comparing unit 53 decides that other radio equipment is sending data, and outputs the sending enabling signal RXE to the sending control unit 60. Further, the demodulation enabling signal DME is outputted from the comparing unit 63 of the sending control unit 60, based on the sending enabling signal RXE and the comparing control signal CPE. Subsequently, the radio frequency unit 10 holds the receiving operation status, further the demodulation unit 30 starts the demodulation operation (step S21).

In the demodulation unit demodulates the receiving data RXD from the radio frequency unit 10 and outputs the receiving data RXD to the receiving control unit 60. The receiving data RXD is saved in the receiving data holding unit 61 and the header of the receiving data RXD is compared with the specified pattern saved in the register 62 by the comparing unit 63 (step S22). In the case of the mismatching result, the demodulation enabling signal DME is halted at the time point when the comparing control signal CPE is stopped, then the operations of the radio frequency and the demodulation unit 30 are halted.

In the case of matching result of the comparing unit 63, it is decided that the receiving data RD is correct, then the data receiving signal RDE is outputted to the output unit 64 and the data processing unit 2. While the receiving enabling signal being given, the demodulation enabling signal DME to the radio frequency unit 10 and the demodulation unit 30 and the data receiving signal RDE to the output unit 64 and the data processing unit 2 continue to be outputted.

Consequently, the receiving signal RXD given from the radio frequency unit 10 is demodulated to the receiving data RXD in the demodulation unit 30, and the receiving data RXD is held in the receiving data holding unit 61. Further, the receiving data RXD is read out by the output unit 64 and is outputted to the data processing unit 2 (step S24).

The data processing 2 moves to the normal operation mode by the data receiving signal RDE, and receives the receiving data RXD outputted from the output unit 64 in serial. The data processing unit 2 decides the end of the received receiving data RXD, based on the contents of the receiving data (ex. the message length information formatted in the header part), then the data processing unit 2 outputs the stop signal STP to the sending and receiving unit 1 and returns to the power saving mode.

In the sending and receiving unit 1, the receiving timing generation unit 82 of the timing control unit 80 is reset by the stop signal STP and the receiving control signal RXC is stopped. Consequently, the receiving enabling signal RXE from the decision unit 50 is halted, and the demodulation enabling signal DME of the receiving control unit 60 is halted, then the operations of the radio frequency unit 10, the demodulation unit 30, and the sending control unit 60 are stopped (step S26).

In the flowchart of FIG. 2, the steps of active operation status of the data processing unit 2 are S1~S4, S12~S15, S24~S26, and other steps are in the power saving mode of the data processing unit 2.

As explained before, the radio communication equipment according to the first embodiment includes separately the receiving timing generation unit 82 for the receiving operation and the sending timing generation unit 83 for the sending operation, consequently, the only requested operation for the sending timing can be conducted and the only requested operation for the receiving timing can be conducted. Furthermore, even when the sending operation cannot be carried out for the request to the sending operation, due to the too-high electric intensity signal RSSI being caused by obstructive radio waves and so on, the radio communication equipment according to the first embodiment can wait the next sending timing without activating the radio frequency unit 10 or the modulation unit 40, and without activating the data processing unit 2, too. In the case of receiving operation, the radio communication equipment according to the first embodiment has the same merit as in the above mentioned case of sending. Consequently, the power consumption can be reduced in other operations than the requested operation.

Second Embodiment

Figure 3:
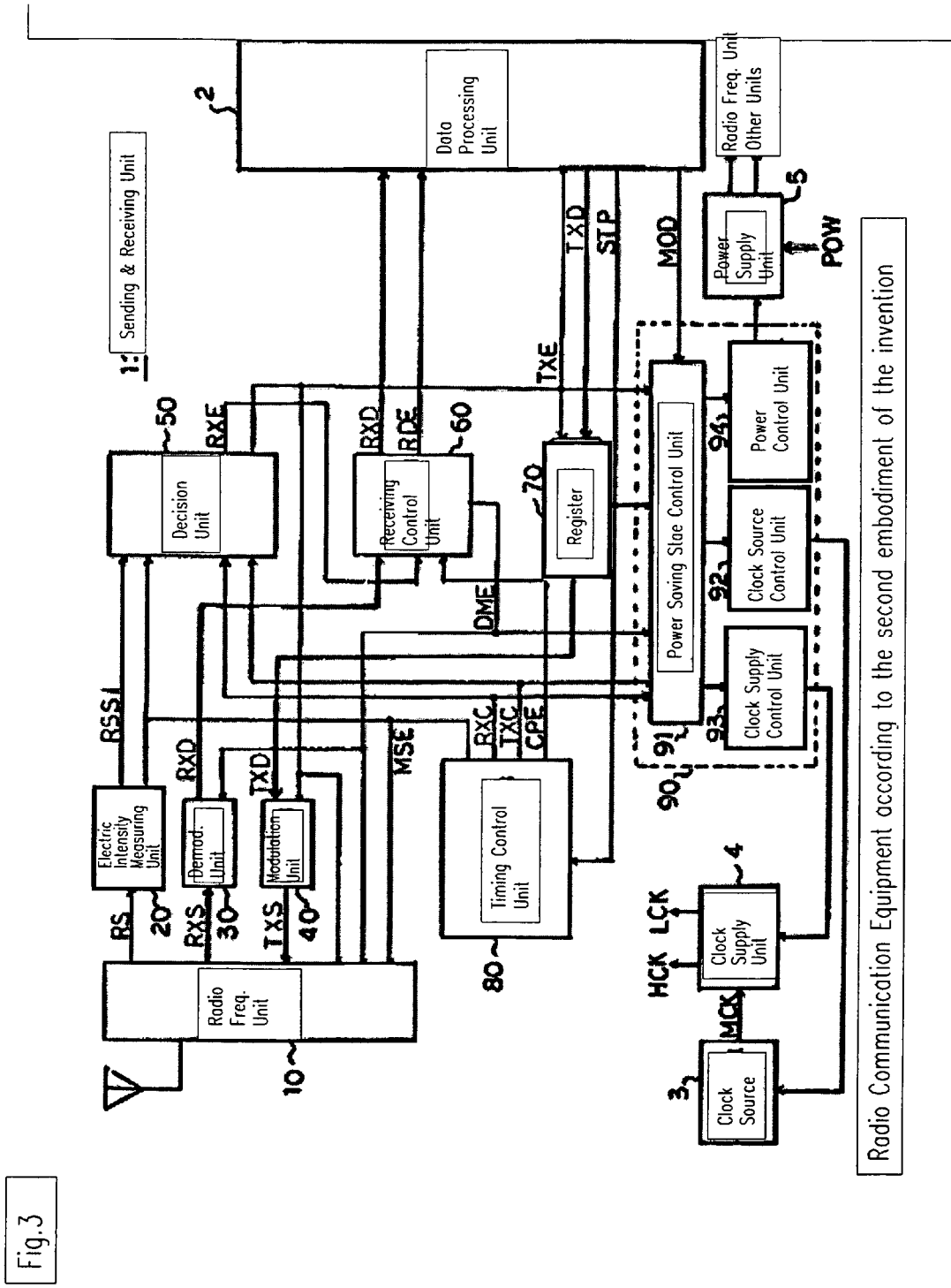
FIG. 3 is a general configuration diagram of a radio communication equipment according to the second embodiment of the invention.

FIG. 3 is a view of general configuration diagram according to the second embodiment of the present invention. The same numerals are put on the identical components to the components in FIG. 1.

The communication equipment according to the second embodiment of the invention adds a power saving unit 90 to the sending and receiving unit 1 of FIG. 1, and at the same time installs a clock source 3, a clock supply unit 4, and a power supply unit 5 being controlled by the power saving control unit 90.

The clock source 3 is a clock source being placed outside the sending and receiving unit 1 and the data processing unit 2 consists of a crystal or a crystal oscillator, and have a function of generating a master clock MCK. The clock supply unit 4 having the function of supplying clocks to every part of the sending and receiving unit 1 can supply a requested clock frequency (ex. high frequency clock HCK, low frequency LCK) only on demand from the every part, based on the master clock MCK. The power supply unit 5 can control separately power supply to the radio frequency unit 10 of the sending and receiving unit 1, and other parts than the timing control unit 80, and the power saving control unit 90.

The power saving unit 90 includes a power saving state control unit 91, a clock source control unit 92 controlling the operation of the clock source 3, a clock supply control unit 93 controlling the operation of clock supply unit 4, and a power control unit 94 controlling the power supply unit 5. The power saving operation state control unit 91 controls the clock source control unit 92, the clock supply control unit 93, and the power control unit 94, based on the operation mode control data MOD from the data processing unit 2, the sending enabling signal TXE from the decision unit 50, the demodulation enabling signal DME from the sending the receiving control unit 60, the receiving control signal RXC and the sending control signal TXC from the timing control unit 80, and the stop signal STP from the data processing unit 2.

The before mentioned operation mode control data MOD is a signal appointing one mode out of three modes as follows, all-operation mode operating all the sending and receiving unit 1 including the radio frequency unit 10, a control mode operating every part except the radio frequency unit 10, or a power saving mode halting the operation except the timing control unit 80 and the power saving unit 90.

Secondly, the operation of the radio communication equipment of FIG. 3, mainly the operation of power saving unit 90, will be explained. The sending and receiving operation of the whole radio communication equipment is the same to the flowchart in FIG. 2.

When the all operation mode is directed by the operation mode control data MOD from the data processing unit 2, the power saving operation state control unit 91 activates the clock source 3 through the clock supply control unit 92 and generates the master clock MCK, then the power saving operation state control unit 91 directs the clock supply unit 4 through the clock supply control unit 93 to supply requested clocks to every part.

When the control operation mode is appointed by the operation mode control data MOD, the power saving operation state control unit 91 activates the clock source 3 through the clock supply control unit 92 to generate the master clock MCK; and controls the clock supply unit 4 through supply control 93 to supply the normal clock (ex. the high frequency clock HCK) to the timing control unit 80 and the power saving unit 90, and to halts clock supply to other units.

When the power saving operation mode is appointed by the operation mode control data MOD, the power saving operation mode state control 91 controls the clock source 3 through the clock source control unit 92 to stop the master clock MCK and generate only the low frequency clock LCK; and controls the clock supply unit 4 through the clock supply control 93 to supply only low frequency clock LCK to the timing control unit 80 and the power saving unit 90, and to halt clock supply to other units. At the same time, power saving state control unit 90 controls the power supply unit 5 through the power control unit 94 to stop the power supply to the radio frequency unit 10 and to supply the necessary and minimum currency to other units.

When the power saving operation state unit 91 is given the sending control signal RXC from the timing control unit 80 in the control operation mode or the power saving operation mode, the power saving operation state unit 91 activates the clock source 3 through the clock source control unit 92 to generate the master clock MCK; and controls the clock supply unit 4 through the clock supply control unit 93 to supply the requested frequency clock to every unit; further, controls the power supply 5 through the power control unit 94 to supply requested normal power to every unit. Consequently, the sending and receiving unit 1 moves to the all-operation mode.

When the modulation enabling signal DME is being outputted from the sending control unit 60, after the specified period responding to the comparing control signal CPE, the all-operation mode is still maintained. Further, at the time point when the modulation enabling signal DME is halted, the power saving operation state unit 91 activates the clock source 3 through the clock source control unit 92 to generate only the low frequency clock LCK; and controls the clock supply unit 4 through the clock supply control unit 93 to supply only the low frequency clock LCK to the timing control unit 80 and the power saving unit 90; further, controls the power supply 5 through the power control unit 94 to supply the necessary and minimum currency to every unit except the radio frequency unit 10. Consequently, the sending and receiving unit 1 moves to the power saving mode.

When the demodulation enabling signal DME is not outputted from the sending control signal 60 after the specified period responding to the comparing control signal CPE, the power saving operation state control unit 91 controls the sending and receiving unit 1 to immediately move to the power saving mode.

Similarly, when the sending control signal TXC is given from the timing control unit 80 in the control operation mode or the power saving operation mode the power saving state control unit 91 controls the sending and receiving unit 1 to move to the all-operation mode.

When the sending enabling signal TXE is being outputted from the decision unit 50 after the specified period responding to the measuring control signal MSE, the and receiving unit 1 is maintained to be in the all-operation mode. Further, at the time point when the stop signal is outputted from the data processing unit 2, the power saving operation control unit 91 controls the sending and receiving unit 1 to moves to the power saving operation mode.

When the sending enabling signal TXE is not outputted from the decision unit 50 after the specified period responding to the measuring control signal MSE, the power saving operation control unit 91 controls the sending and receiving unit 1 to move immediately to the power saving mode.

In the before-mentioned operation modes of the sending and receiving unit 1 in the flowchart of FIG. 2, the step S1~S4 are in the control operation mode, the step S5,S6 are in the power saving mode, and other steps S7~S26 are in the all-operation mode.

As explained before, the radio communication equipment according to the second embodiment of the invention includes the power saving operation state control unit 90, having a function of power supply control and clock supply control to every unit of the sending and receiving unit 1 responding to the operation modes. Consequently, according to the second embodiment, besides the power control of the data processing unit 2, the power control of sending and receiving unit 1 also can be conducted, then there is an effect of further reducing power consumption than the first embodiment of the invention.

This is a counterpart of and claims priority to Japanese patent application Serial Number 142983/2005, filed on May 16, 2005, the subject matter of which is incorporated herein by reference.

What is claimed is:

1. A radio communication equipment comprising:
a sending and receiving unit configured to send and receive data to and from other radio stations by radio signals, and
a data processing unit configured for processing sending and receiving data and conducting an operation control of said sending and receiving unit,
a control unit configured to output a sending timing signal and receiving timing signal at a fixed interval;
a radio signal intensity measuring unit configured to measure an intensity of a radio signal of a radio channel when said sending timing signal or said receiving timing signal is given;
a decision unit configured to compare the measured radio signal with a predetermined threshold level, based on a measuring control signal, a receiving control signal, and a sending control signal, being given from a timing control unit, and
wherein said timing unit is configured to generate said measuring control signal, said receiving control signal and said sending control signal based on a fixed range;
based on said comparison, said decision unit configured to output a sending enabling signal when said measured radio signal has an intensity less than a predetermined threshold level, and to output a receiving enabling signal when said measured radio signal has an intensity greater than the predetermined threshold level;
a modulation unit configured to modulate sending data from said data processing unit and output the data thereof, when said sending enabling signal is given;
a demodulation unit configured to demodulate received data and to generate receiving data, when said receiving enabling signal is given; and
a receiving control unit configured to provide a demodulation enabling signal to said demodulation unit when said receiving enabling signal is given, to decide whether or not said receiving data generated in said demodulation unit are correct, and to output said receiving data to said data processing unit when said receiving data are correct and to stop said demodulation enabling signal when said receiving data are not correct,
wherein said data processing unit is configured to be activated by said sending enabling signal, to output said sending data to said sending and receiving unit, to be activated by said receiving signal, and to input said receiving data from said receiving unit.

2. The radio communication equipment according to the claim 1, further comprising a power saving control unit configured to control a clock supply and power supply to said sending and receiving unit, being directed said sending timing signal, receiving timing signal, said sending enabling signal, said demodulation enabling signal, and said operation mode control signal from said data processing unit.

3. A radio communication method, comprising:
sending and receiving data to and from radio stations by radio signals, and
processing sending and receiving data; and conducting an operation control of said sending and receiving data;
outputting a sending timing signal and a receiving timing signal at a fixed interval;
measuring an intensity of a radio signal of a radio channel when said sending timing signal or said receiving timing signal is given;
comparing the measured radio signal with a predetermined threshold level, based on a measuring control signal, a receiving control signal, and a sending control signal generated based on a fixed range;
based on said comparison, outputting a sending enabling signal when said measured radio signal has an intensity less than the predetermined threshold level, and outputting a receiving enabling signal when said measured radio signal has an intensity greater than the predetermined threshold level;

modulating sending data and outputting the data thereof, when said sending enabling signal is given;

demodulating received data and generating receiving data, when said receiving enabling signal is given; and providing a demodulation enabling signal when said receiving enabling signal is given, deciding whether or not said receiving data generated are correct, and outputting said receiving data when said receiving data are correct and to stop said demodulation enabling signal when said receiving data are not correct; outputting said sending data when said sending enabling signal is given; and inputting said receiving data when said sending enabling signal is given.

4. The radio communication method according to claim 3, further comprising halting the sending operation when the measured radio signal intensity is greater than the stored value in the sending timing.

5. The radio communication method according to claim 4, further comprising halting the receiving operation when the measured radio signal intensity is smaller than the stored value in the receiving timing.

* * * * *